(12) United States Patent
McMurry

(10) Patent No.: US 11,971,117 B2
(45) Date of Patent: Apr. 30, 2024

(54) VALVE ASSEMBLIES

(71) Applicant: Advanced Control Products, LLC, Cincinnati, OH (US)

(72) Inventor: Kenneth McMurry, Cincinnati, OH (US)

(73) Assignee: Advanced Control Products, LLC, Cincinnati, OH (US)

( * ) Notice: Subject to any disclaimer, the term of this patent is extended or adjusted under 35 U.S.C. 154(b) by 0 days.

(21) Appl. No.: 17/147,805

(22) Filed: Jan. 13, 2021

(65) Prior Publication Data

US 2022/0221066 A1 Jul. 14, 2022

(51) Int. Cl.
*F16K 5/06* (2006.01)
*F16K 5/10* (2006.01)

(52) U.S. Cl.
CPC ............. *F16K 5/0647* (2013.01); *F16K 5/10* (2013.01); *F16K 5/0636* (2013.01)

(58) Field of Classification Search
CPC ........ F16K 5/0647; F16K 5/10; F16K 5/0636; F16K 5/204; F16K 5/0605; F16K 5/0689; F16K 5/20; F16K 27/067; F16K 1/222; F16K 5/14; Y10T 137/6035
USPC ................... 251/315.07, 128, 192
See application file for complete search history.

(56) References Cited

U.S. PATENT DOCUMENTS

| | | | | |
|---|---|---|---|---|
| 3,565,099 A | * | 2/1971 | Huber | F16K 5/0407 137/269.5 |
| 3,623,696 A | * | 11/1971 | Baumann | F16K 1/2028 251/85 |
| 4,428,561 A | | 1/1984 | Thompson | |
| 4,524,946 A | * | 6/1985 | Thompson | F16K 5/0678 251/316 |
| 4,822,000 A | * | 4/1989 | Bramblet | F16K 5/0647 251/180 |
| 4,930,748 A | | 6/1990 | Gonsior | |

(Continued)

FOREIGN PATENT DOCUMENTS

JP S60237274 A 11/1985

OTHER PUBLICATIONS

International Search Report and Written Opinion for application PCT/US2021/013227 dated Nov. 29, 2021 (21 pages).

*Primary Examiner* — Craig J Price
*Assistant Examiner* — Andrew J Rost
(74) *Attorney, Agent, or Firm* — Dinsmore & Shohl

(57) ABSTRACT

A valve assembly includes a housing, a segmented stem, a ball segment, a biasing element, and an adjustment bolt. The housing includes a flow duct connecting a first flow opening to a second flow opening and a neck defining an elongated chamber. The segmented stem includes an upper portion and a lower portion, wherein the upper portion is positioned within the elongated chamber and the lower portion is coupled to the housing. The ball segment includes a first attachment portion, a second attachment portion, and a curved portion extending between the first attachment portion and the second attachment portion. The biasing element is positioned between the first attachment portion and the upper portion. The adjustment bolt is coupled to the lower portion, wherein the biasing element and the adjustment bolt adjusts the ball segment toward a seated position when the ball segment is rotated to a closed position.

13 Claims, 5 Drawing Sheets

(56) References Cited

U.S. PATENT DOCUMENTS

| | | | | |
|---|---|---|---|---|
| 5,564,461 | A * | 10/1996 | Raymond, Jr. | F16K 31/00 |
| | | | | 137/315.35 |
| 5,820,103 | A * | 10/1998 | Nilsson | F16K 5/0605 |
| | | | | 251/315.09 |
| 6,076,831 | A * | 6/2000 | Pfannenschmidt | F16K 5/0694 |
| | | | | 251/214 |
| 6,378,842 | B1 * | 4/2002 | Frese | F16K 5/0636 |
| | | | | 251/298 |
| 8,382,067 | B2 * | 2/2013 | Xu | F16K 41/04 |
| | | | | 251/214 |
| 8,398,055 | B2 | 3/2013 | Yin | |
| 8,864,105 | B2 * | 10/2014 | Xu | F16K 5/204 |
| | | | | 277/529 |
| 9,074,690 | B2 * | 7/2015 | Winterholler | F16K 11/18 |
| 9,791,054 | B2 * | 10/2017 | Al-Amri | F16K 5/10 |
| 10,208,863 | B2 * | 2/2019 | Robinson | F16K 5/0647 |
| 2008/0169442 | A1 * | 7/2008 | Colton | F16K 5/0647 |
| | | | | 251/309 |
| 2011/0049408 | A1 * | 3/2011 | Gutmann | F16K 5/0626 |
| | | | | 251/315.08 |
| 2014/0061514 | A1 * | 3/2014 | Fan | F16K 5/0647 |
| | | | | 251/1.1 |
| 2015/0137020 | A1 * | 5/2015 | Fan | F16K 5/0647 |
| | | | | 251/315.01 |

* cited by examiner

VALVE ASSEMBLIES

TECHNICAL FIELD

The present specification generally relates to valve assemblies and, more specifically, rotary globe valve assemblies.

BACKGROUND

Rotary globe valves may be used to regulate fluid flow in various civil and/or industrial environments. While some valves may be manually actuated, it may be desirable to provide automated actuation of a valve through use of an actuator. However, various actuators may be used to operate a valve, each of which may include their own mounts and/or tools necessary to mechanically couple the actuator and the valve. This may make retooling valves for different actuators time consuming and expensive.

Accordingly, a need exists for alternative rotary globe valves that may include modular multiple connectors to connect different actuators as needed.

SUMMARY

In one embodiment, a valve assembly includes a housing, a segmented stem, a ball segment, a biasing element, and an adjustment bolt. The housing includes a first flow opening, a second flow opening, a flow duct connecting the first flow opening to the second flow opening, and a neck defining an elongated chamber extending from the flow duct. The segmented stem includes an upper portion and a lower portion, wherein the upper portion is positioned within the elongated chamber of the neck and the lower portion is coupled to the housing opposite the elongated chamber. The ball segment includes a first attachment portion coupled to the upper portion of the segmented stem and a second attachment portion coupled to the lower portion of the segmented stem, and a curved portion extending between the first attachment portion and the second attachment portion. The biasing element is positioned between the first attachment portion and the upper portion of the segmented stem. The adjustment bolt is coupled to the lower portion of the segmented stem, wherein the biasing element and the adjustment bolt adjusts the ball segment toward a seated position when the ball segment is rotated to a closed position.

In another embodiment, a valve assembly includes a housing, a segmented stem, a ball segment, and an adaptor. The housing includes a first flow opening, a second flow opening, a flow duct connecting the first flow opening to the second flow opening, and a neck defining an elongated chamber extending from the flow duct. The segmented stem includes an upper portion and a lower portion, wherein the upper portion is positioned within the elongated chamber of the neck and the lower portion is coupled to the housing opposite the elongated chamber. The ball segment includes a first attachment portion coupled to the upper portion of the segmented stem and a second attachment portion coupled to the lower portion of the segmented stem, and a curved portion extending between the first attachment portion and the second attachment portion. The adaptor is replaceably coupled to the upper portion of the segmented stem and is configured to couple an actuator to the upper portion of the segmented stem.

In yet another embodiment, a valve assembly includes a housing, a segmented stem, a ball segment, a bonnet, and an actuator. The housing includes a first flow opening, a second flow opening, a flow duct connecting the first flow opening to the second flow opening, and a neck defining an elongated chamber extending from the flow duct. The segmented stem includes an upper portion and a lower portion, wherein the upper portion is positioned within the elongated chamber of the neck and the lower portion is coupled to the housing opposite the elongated chamber. The ball segment includes a first attachment portion coupled to the upper portion of the segmented stem and a second attachment portion coupled to the lower portion of the segmented stem, and a curved portion extending between the first attachment portion and the second attachment portion. The bonnet is coupled to the neck and includes a modular multiple connector platform with a plurality of mounting openings, wherein the plurality of mounting openings include a first set and a second set. The actuator is interchangeably coupled to the modular multiple connector platform via one of the first set or the second set of the plurality of mounting openings.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures generally depict an embodiment of a valve assembly for regulating fluid flow. The valve assemblies according to the present disclosure are directed to rotary globe valves and may also be referred to as eccentric plug valves, including flange or wafer style valves. Such valves include a rotating plug or ball segment that is rotated into and out of a flow path of the valve. Such rotation determines flow characteristics through the valve including a flow coefficient (Cv) of the valve, which is a function of flow rate and pressure loss through the valve. Accordingly, movement of the ball segment may be used to control either the flow rate or differential pressure within the fluid flow path, as desired. As will be described in greater detail herein, the ball segment may be coupled to a segmented stem. A face of the ball segment and a vertical centerline along the segmented stem may be laterally offset from one another, and the vertical centerline and a horizontal centerline (e.g., in a flow direction) may be laterally offset giving the valve a double eccentric design that allows the plug to lift smoothly from a closed position (e.g., off a seat of the valve) with minimal friction and eliminating potential breakaway torque. The smooth opening can also provide stable control, even at small opening angles and angle adjustments.

In some embodiments, as will be described in greater detail herein, the valve may be modularly adaptable to various actuator types and manufacturers to enable automated control. For example, in embodiments according to the present disclosure the valve may include an integral modular multiple connector platform defining a plurality of mounting openings. The plurality of mounting openings may include a first plurality of mounting openings corresponding to a first actuator type, a second plurality of mounting openings corresponding to a second actuator type, etc. In some embodiments, adaptors for coupling the segmented stem of the valve to the actuator may also be included, or may be separately available. Accordingly, the valves according to the present disclosure may be easily and quickly retooled for different types of actuators as desired.

In some embodiments, to provide for improved seating of the ball segment into the valve seat, one or more biasing elements may be included at the ball segment. The biasing elements may bias the ball segment into contact with the valve seat to provide for some adjustment of the ball segment and to provide a fluid-tight seal, thereby increasing reliability of the valve and valve life. These and additional features will be described in greater detail below.

Figure 1A:
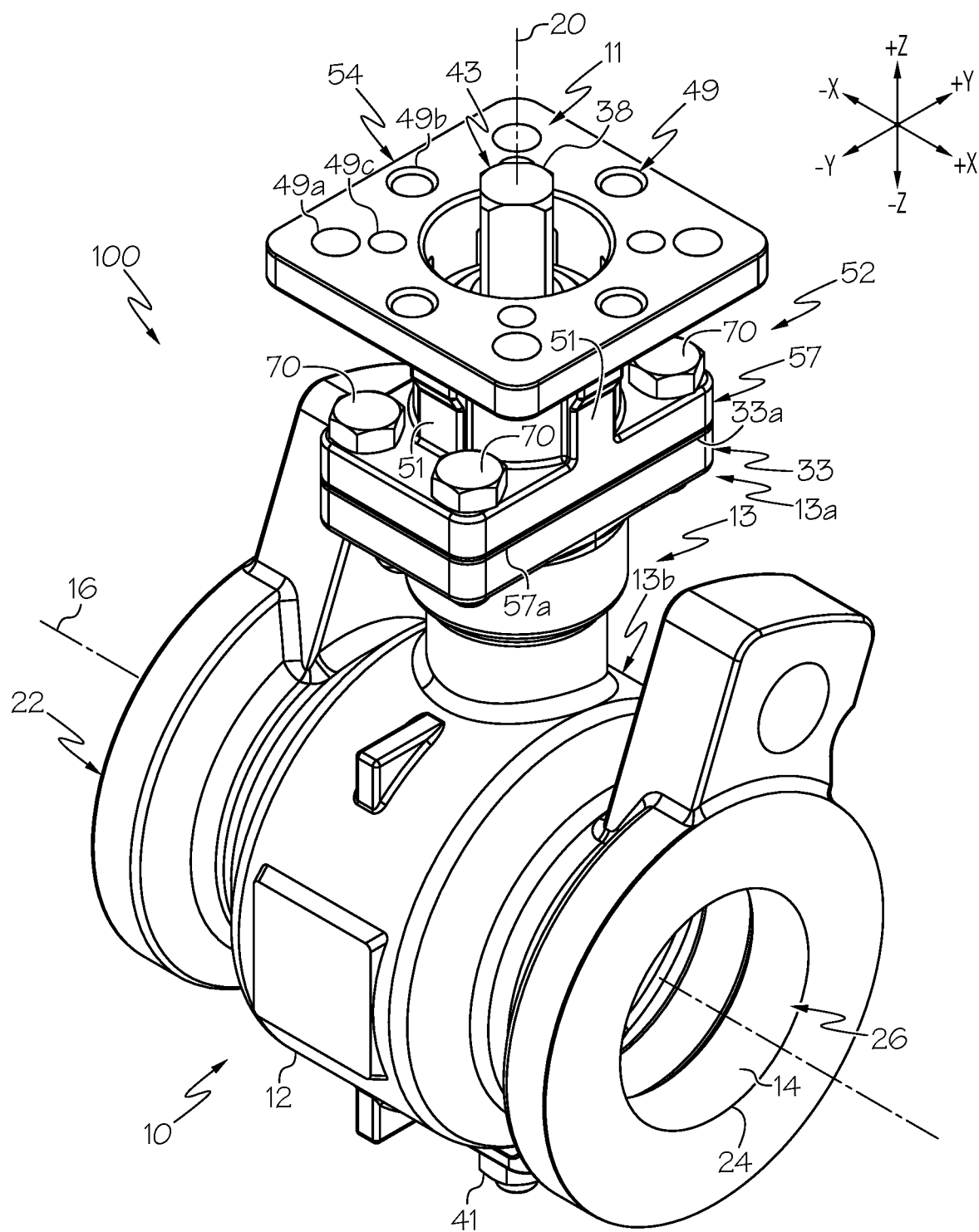
FIG. 1A is a perspective view of a valve assembly, according to one or more embodiments shown and described herein.
Figure 1B:
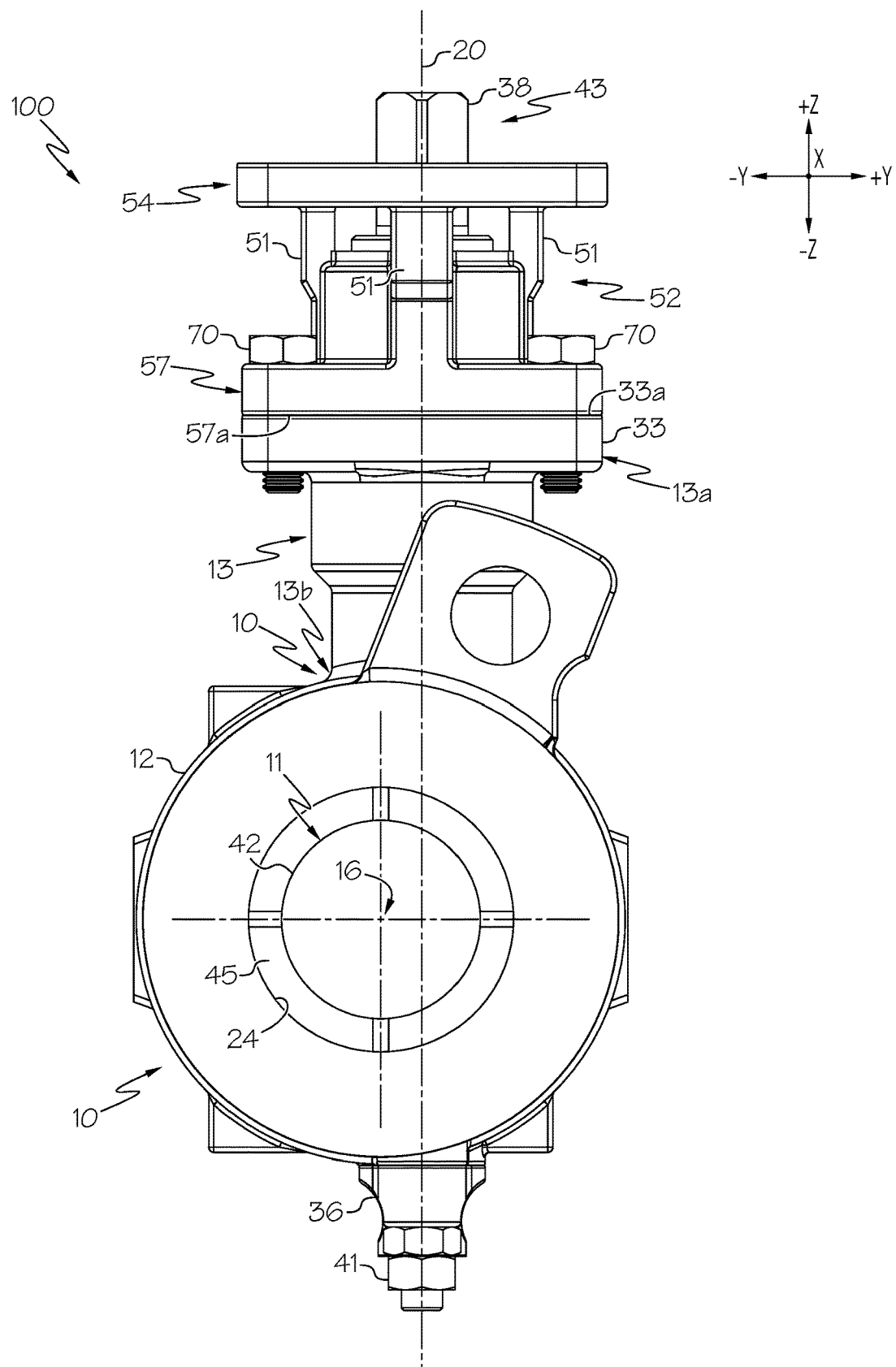
FIG. 1B is a side view of the valve assembly of FIG. 1A, according to one or more embodiments shown and described herein.
Figure 1C:
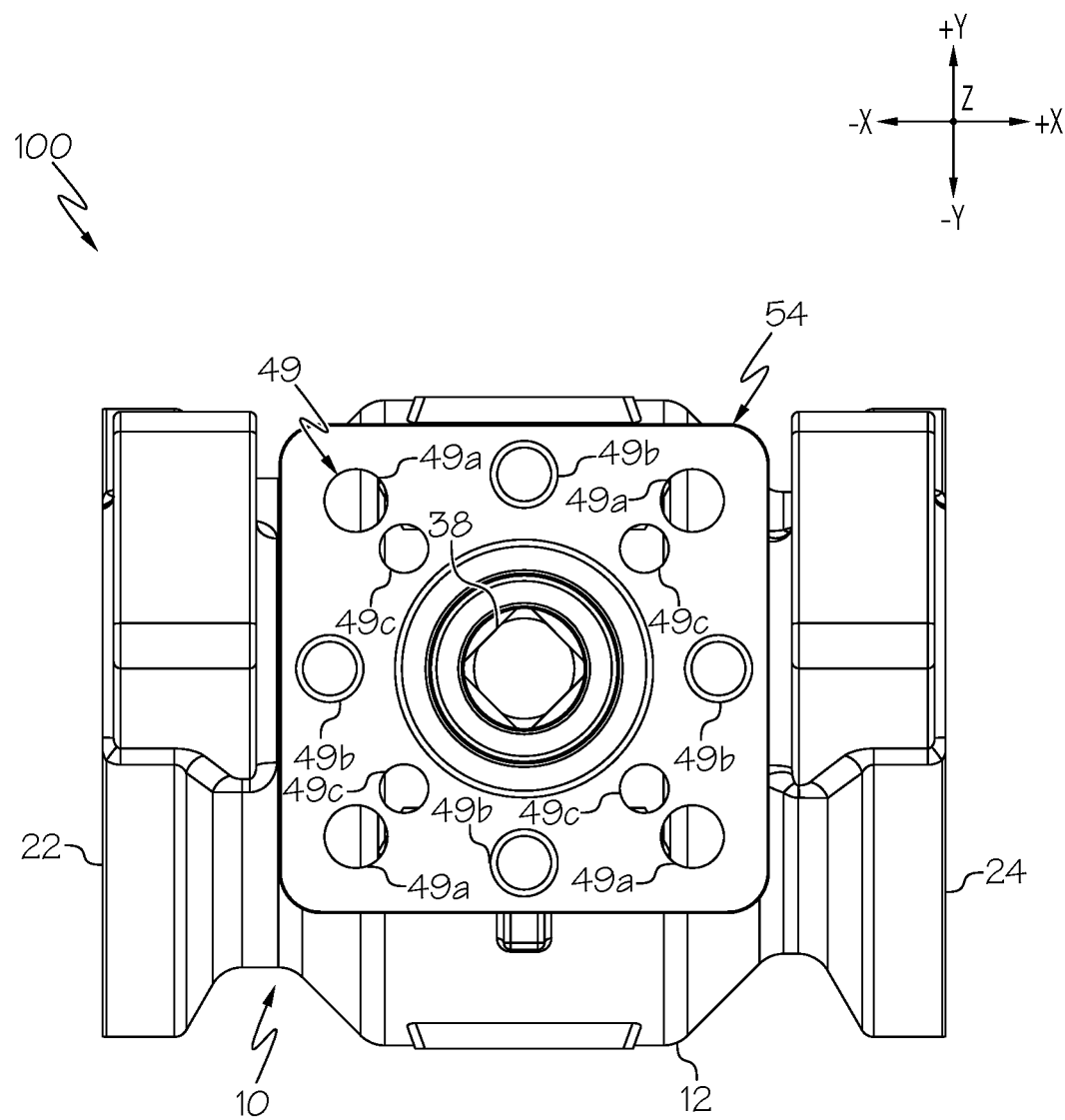
FIG. 1C is a top view of the valve assembly of FIG. 1, according to one or more embodiments shown and described herein.

Referring now to FIGS. 1A-1C, a valve assembly 100 is generally depicted. As noted herein above, valve assemblies according to the present disclosure include rotary globe valves (also referred to as eccentric plug valves). The valve assembly 100 may generally include a housing 10, a plug 11 (depicted in FIGS. 2A and 2B), and a bonnet 52. As will be described below, additional components may be included without departing from the scope of the present disclosure.

As illustrated in FIG. 1A, the housing 10 may generally include a main housing body 12 defining a first flow opening 22, a second flow opening 24, and a flow duct 26 extending between and fluidically coupling the first flow opening 22 and the second flow opening 24. The flow duct 26 may be generally cylindrical though other cross-sections are contemplated and possible. The flow duct 26 defines a first inner surface 14 of the housing 10, extending between the first flow opening 22 and the second flow opening 24, thereby defining a flow path through the housing 10. As depicted, a horizontal centerline 16 extends horizontally through a geometric center of the flow duct 26 from the first flow opening 22 to the second flow opening 24.

The housing 10 further includes a neck 13 extending vertically (e.g., along the Z direction of the depicted coordinate axes) from the main housing body 12. The neck 13 generally includes a first end 13a and a second end 13b opposite the first end 13a. The neck 13 and the main housing body 12 may be integral with one another such that they are integrally manufactured (via machining, casting, or the like) or may be separate components fixedly coupled to one another such as via welding. The neck 13 may further include a bonnet mounting flange 33 extending from the first end 13a. For example, the bonnet mounting flange 33 may extend parallel to the X direction of the depicted coordinate axes and/or the Y direction of the depicted coordinate axes and define a bonnet engagement surface 33a. As will be described in more detail below with respect to FIGS. 2A and 2B, a portion (e.g., the upper portion 38) of a segmented stem 43 of the plug 11 extends through the neck 13 to be positioned outside of the neck 13 in the Z direction of the depicted coordinate axes.

In some embodiments, the housing 10, including the main housing body 12 and the neck 13, may be made from a variety of metals or metal alloys, such as but not limited to austenitic steel, cast iron, ductile iron, cast carbon steel, gun metal, stainless steel, alloy steels, or the like, and may be machined, cast, 3D printed, or the like.

As further illustrated in FIGS. 1A and 1B, coupled to the neck 13 may be the bonnet 52. The bonnet 52 generally includes a mating flange 57 configured to mate to the bonnet mounting flange 33 of the housing 10. For example, the mating flange 57 may have a mating surface 57a that is contacted to the bonnet engagement surface 33a of the bonnet mounting flange 33. The mating flange 57 and the bonnet mounting flange 33 may then be fixed relative to one another via one or more fasteners 70 (e.g., two or more fasteners, three or more fasteners, four or more fasteners, etc.). As will be described in greater detail below, the bonnet 52 may include an extension portion 56 (shown in FIGS. 2A and 2B) extending from the mating flange 57 that is sized and shaped to be received within the neck 13.

Referring collectively to FIGS. 1A-1C, the bonnet 52 may further include a modular multiple connector platform 54 configured to mount one or more actuators to the valve assembly 100, such as interchangeably to a plurality of different actuators. The modular multiple connector platform 54 may be stepped or spaced from the mating flange 57 in the +Z direction of the depicted coordinate axes. One or more pillars 51 (e.g., such as two more, three or more, four or more, etc.) may extend between and couple the mating flange 57 and the modular multiple connector platform 54 to provide additional structural support to the modular multiple connector platform 54. The modular multiple connector platform 54 may include a plurality of mounting openings 49 for coupling to a variety of different actuator types (e.g., such as a first actuator, a second actuator, etc.) having different mounting configurations without a need for removing and replacing the modular multiple connector platform 54 with another connector type. For example, the plurality of mounting openings 49 may provide openings through which fasteners (not shown) may be positioned to mount an actuator to the modular multiple connector platform 54. In embodiments, and with reference to FIG. 1C, the plurality of mounting openings 49 may be divided into at least a first set 49a and a second set 49b. The first set 49a of the plurality of mounting openings 49 may be configured to interchangeably mount a first actuator (not shown) to the valve assembly 100 and the second set 49b of the plurality of mounting openings 49 are configured to interchangeably mount a second actuator (not shown) to the valve assembly 100. In yet further embodiments, additional sets of the mounting openings may be provided to mount yet further actuators (for example a third set 49c, as depicted in FIG. 1, a fourth set, a fifth set, etc.). In embodiments, each set of mounting openings 49 includes four mounting openings. However, each set may include one mounting opening, two mounting openings, three mounting openings, etc.

In embodiments, the first set 49a of mounting openings 49 may include openings each having a first diameter, while the second set 49b of mounting openings 49 may include openings each having a second diameter, which is different from the first diameter. For example, the second diameter may be smaller than the first diameter. In the indicated embodiment, the third set 49c of mounting openings 49 may each have a third diameter, which may be smaller than the second diameter, though other embodiments are contemplated and possible. While circular openings are illustrated, the openings may be any suitable shape for mounting to a type of actuator. Further, the arrangements of the sets of openings may be spaced from segmented stem 43 different distances depending on the type of actuator. In this way, the valve assembly 100 may be adapted for use with a variety of different actuators. In conventional practice, each actuator typically requires a designated mounting bracket or bonnet which must be individually mounted to a valve assembly for use. By providing a bonnet 52 having the modular multiple connector platform 54 having different mounting openings corresponding to different type actuators, the valve assembly 100 may be more easily mounted to a different actuator as desired without need for replacement of a mounting bracket or the bonnet 52.

In some embodiments, the bonnet 52 is made of austenitic steel. However, the bonnet 52 may be made of any suitable material, including cast iron, ductile iron, cast carbon steel, gun metal, stainless steel, alloy steels, and forged steels. In some embodiments, the bonnet 52 may be the same or a different material from the housing 10.

As illustrated in FIGS. 1A-1C, the plug 11 may include a stem such as the segmented stem 43, which will be described in greater detail below. The segmented stem 43 may extend to a position external the neck 13 and the bonnet 52, which may allow the segmented stem 43 to be mounted to an actuator. In some embodiments, it is contemplated that a manual actuator, e.g., a crank, lever, or the like, may be mounted to the end to the segmented stem 43, above the bonnet 52, to allow for manual rotation of the plug 11. In yet further embodiments, and as will be described in greater detail with respect to FIGS. 2A and 2B, an adaptor 62 may be interchangeably mounted to the segmented stem 43 which allows the actuator to mechanically engage and rotate the segmented stem 43.

Figure 2A:
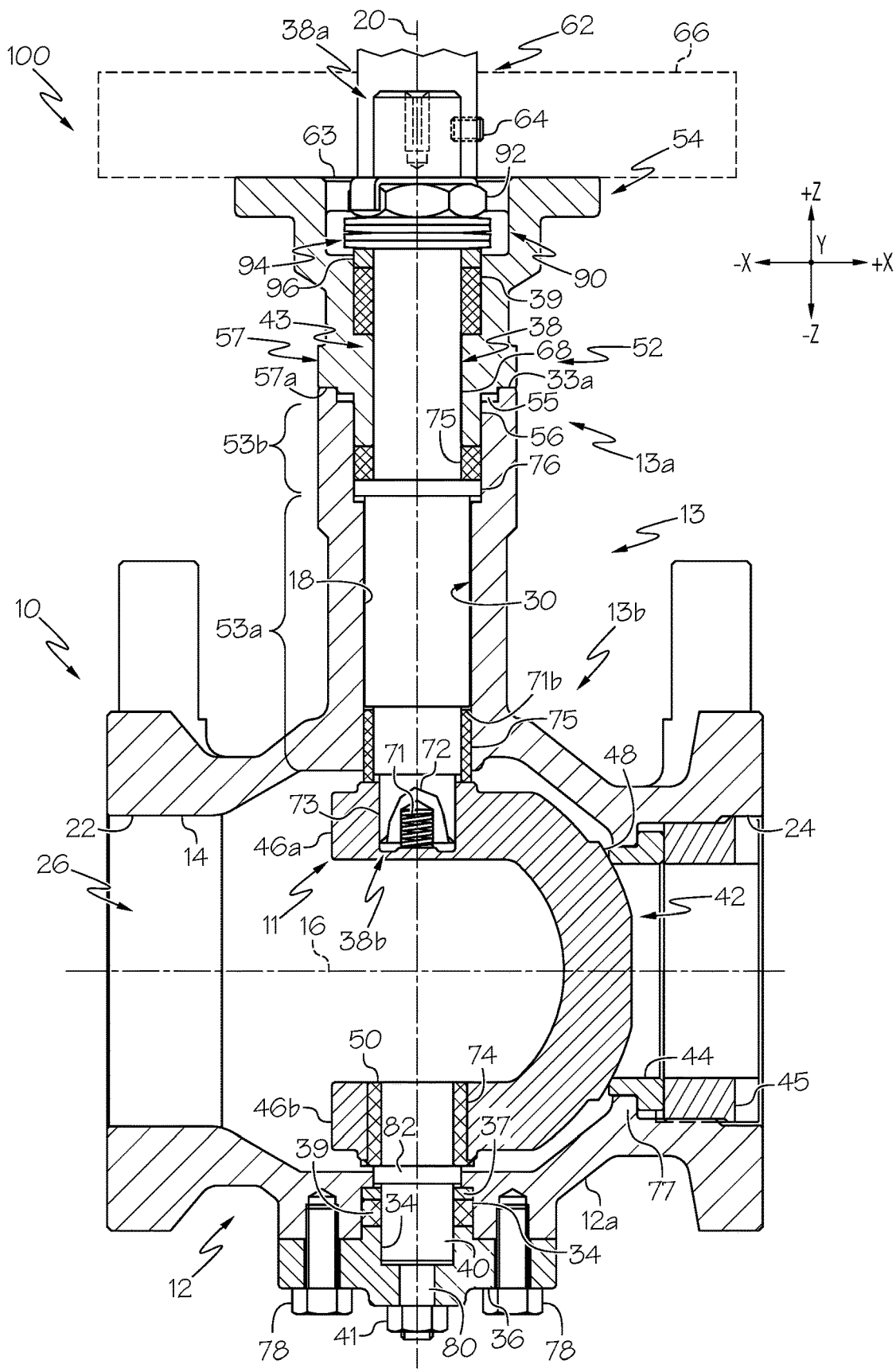
FIG. 2A is a sectional view of the valve assembly of FIG. 1 in a closed position, according to one or more embodiments shown and described herein.
Figure 2B:
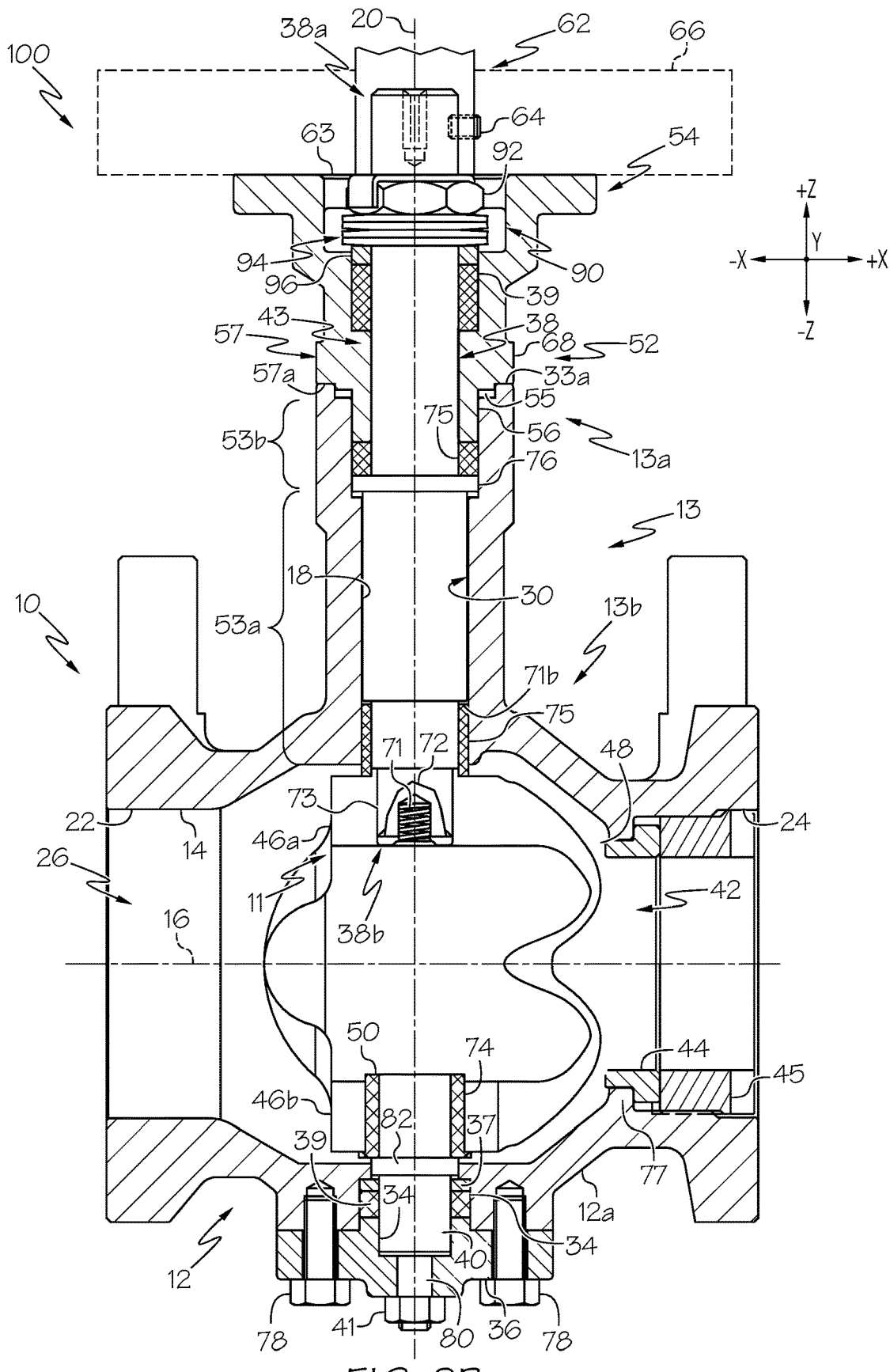
FIG. 2B is a sectional view of the valve assembly of FIG. 1 in an open position, according to one or more embodiments shown and described herein.

Referring now to FIGS. 2A and 2B a cross-sectional view of the valve assembly 100 with an adaptor 62 and an actuator 66 (shown in dashed lines) are schematically depicted. From this perspective, additional details of the plug 11 and other contours of the neck 13, main housing body 12, and bonnet 52 are illustrated.

As depicted, the neck 13 defines an elongated chamber 30 extending vertically therethrough from the flow duct 26 through the first end 13a of the neck 13. The elongated chamber 30 defines a vertical centerline 20 through a geometric center of the elongated chamber 30. The elongated chamber 30 may include a first diameter portion 53a and a second diameter portion 53b arranged above the first diameter portion 53a in the +Z direction of the depicted coordinate axes. In embodiments, the first diameter portion 53a comprises a smaller diameter than the second diameter portion 53b.

Still referring to FIGS. 2A and 2B, the bonnet 52 may be positioned within the second diameter portion 53b. For example, the bonnet 52 may include an extension portion 56 sized to fit within the first diameter portion 53a of the neck 13. A bonnet passage 68 may extend through the bonnet 52 and be aligned within the elongated chamber 30 to allow for the segmented stem 43 of the plug 11 to extend therethrough. In some embodiments, a gasket 55 may be positioned between the bonnet 52 and the neck 13 to provide a fluid seal. As noted above, and as illustrated in FIG. 1A, the bonnet 52 may be fixed to the neck 13 via fasteners 70 which couple the mating flange 57 of the bonnet 52 with the bonnet mounting flange 33 of the neck 13.

Still referring to FIGS. 2A and 2B, the plug 11 is generally depicted. In particular, the plug 11 generally includes the segmented stem 43, as noted above, and a ball segment 42 coupled to the segmented stem 43. In the depicted embodiment, the segmented stem 43 includes an upper portion 38 and a lower portion 40 separated from the upper portion 38 via a separation distance. That is the upper portion 38 and lower portion 40 are separated from one another such that the segmented stem 43 is discontinuous along its length in the Z direction of the depicted coordinate axes.

As depicted, the upper portion 38 of the segmented stem 43 may be an elongated member extending between an upper end 38a and a lower end 38b. The upper portion 38 may sit within the elongated chamber 30 and the bonnet passage 68 such that the upper end 38a of the upper portion 38 extends vertically out of the bonnet 52 and the lower end 38b extends into the flow duct 26. Extending radially from the upper portion 38 between the upper end 38a and the lower end 38b may be a limit flange 76, which has a diameter larger than the first diameter portion 53a, such that the limit flange 76 may sit within the second diameter portion 53b and limit movement of the upper portion 38 into the elongated chamber 30 in the −Z direction of the depicted coordinate axes and into the first diameter portion 53a.

In embodiments, formed within the lower end 38b of the segmented stem 43 may be a spring recess 72, which extends upward in the +Z direction of the depicted coordinate axes into the upper portion 38 of the segmented stem 43. A biasing element 71 (e.g., a spring) may be positioned within the spring recess 72. The biasing element 71 may act as a biasing member, and may provide a biasing force to bias the ball segment 42, as will be described in greater detail herein.

The upper portion 38 of the segmented stem 43 may be rotated to move the plug 11 from an open position allowing fluid to flow through the valve assembly 100 to a closed position, preventing fluid from flowing through the valve assembly 100. In various embodiments, one or more bearings 75 may be positioned between the stem and a wall of the neck 13 and/or the bonnet 52 to support rotational movement of the upper portion 38 of the segmented stem 43. For example, a first bearing may be positioned adjacent the lower end 38b of the upper portion 38 within the first diameter portion 53a and a second bearing may be positioned within the second diameter portion 53b beneath the extension portion 56 of the bonnet 52. For example, the second bearing may sit upon the limit flange 76.

The lower portion 40 of the segmented stem 43 may also be an elongated, member and is arranged in vertical alignment (e.g., along the vertical centerline 20) with the upper portion 38. As depicted the main housing body 12 may have a stem mounting bore 34 for receiving the lower portion 40 of the segmented stem 43 therethrough. A second limit flange 82 may extend radially from the lower portion 40. In embodiments, while the upper portion 38 is rotatable relative to the housing 10, the lower portion 40 may not rotate relative to the housing 10. In some embodiments, the positioning of the lower portion 40 may be adjustable in the vertical direction, as will be described in greater detail below.

In some embodiments, the segmented stem 43 including the upper portion 38 and lower portion 40 may be made of any suitable material, including cast iron, ductile iron, cast carbon steel, gun metal, stainless steel, alloy steels, and forged steels. In some embodiments, the various portions of the segmented stem 43 may have a chrome plating, though other coatings are contemplated and possible.

The ball segment 42 generally provides a flow blocking structure coupled to both the upper portion 38 and the lower portion 40 of the segmented stem 43. Accordingly, the ball segment 42 may include a first attachment portion 46a coupled to the upper portion of the segmented stem 43 and a second attachment portion 46b coupled to the lower portion 40 of the stem opposite from the upper portion 38. Each of the first attachment portion 46a and the second attachment portion 46b includes a stem opening 73, 74 for receiving and coupling to the segmented stem 43. In embodiments, the ball segment 42 may be rigidly coupled to the upper portion 38 of the segmented stem 43 and rotatively coupled to the lower portion 40 of the segmented stem 43. Accordingly when the upper portion 38 of the segmented stem 43 is rotated (e.g., via an actuator) the ball segment rotates with the upper portion 38, relative to the lower portion 40. For example, one or more bearings 50 may support rotational movement of the ball segment 42 relative to the lower portion 40. In embodiments, the second limit flange 82 may engage the one or more bearings 50, which may limit a distance which the lower portion 40 may extend into stem opening 74.

A curved portion 48 extends between the first attachment portion 46a and the second attachment portion 46b. For example, the curved portion 48 curves away from the vertical centerline 20 so as to be as to be laterally offset from the vertical centerline 20. Further, the vertical centerline 20 is also offset from the center of the attachment portions 46a and 46b. In embodiments, an apex of the curved portion 48 is positionable so as to pass into and be aligned with the horizontal centerline 16 when positioned in the closed position, illustrated in FIG. 2A. When rotated to the open position (e.g., via rotating the upper portion 38 of the segmented stem 43), as illustrated in FIG. 2B, the ball segment 42 is positioned away from the horizontal centerline so as to provide a substantially open flow path from first flow opening 22 to the second flow opening 24. For example, the curved shape of the ball segment 42 allows the ball segment 42 to be arranged out of the way of the flow path when moved to an open position. It is noted that in some embodiments, the ball segment 42 may be only partially rotated out of the flow path to allow for control of pressure and/or flow rate through the valve assembly 100.

The ball segment 42 may be made of a metal, specifically, one with a high tensile strength. For example, the ball segment 42 may be made of any suitable material, including cast iron, ductile iron, cast carbon steel, gun metal, stainless steel, alloy steels, and forged steels. In some embodiments, the ball segment 42 is include a hardened chrome plating.

To provide a reliable seal, coupled to the main housing body 12 may be a valve seat 44 annularly disposed about the horizontal centerline 16 of the main housing body adjacent the second flow opening 24. As depicted, the valve seat 44 may be coupled to the first inner surface 14 and create a seal when in contact with the ball segment 42 to fluidly seal the flow duct 26. Accordingly, the valve seat 44 may be shaped to compliment the shape of the ball segment 42 to form the seal. Positioned adjacent the valve seat 44 may be an insert cap 45, which may act to hold the valve seat 44 in place. For example, the insert cap 45 may threadingly or otherwise couple to the main housing body 12 and cause the valve seat 44 to be sandwiched between a projecting ring 77 of the main housing body 12 and the insert cap 45. The valve seat 44 and the insert cap 45 may both be formed from stainless steel, or any suitable material, including cast iron, ductile iron, cast carbon steel, gun metal, alloy steels, and forged steels.

Referring still to FIGS. 2A and 2B, an end cap 36 may be mounted to an external surface 12a of the main housing body 12 at the stem mounting bore 34 so as to cover the stem mounting bore 34 and the lower portion 40 of the segmented stem 43. The end cap 36 may be mounted to the main housing body 12 via one or more fasteners 78. However, the end cap 36 may be mounted to the mounting area of the housing 10 using other suitable methods, such as using other fixtures, brazing, welding, or the like. The end cap 36 further includes an adjustment hole 80, which may be internally threaded.

An adjustment bolt 41 may be positioned within the adjustment hole 80 and maybe be adjustably positioned to contact and move the lower portion 40 of the segmented stem as desired. Adjusting the position of the lower portion 40 of the segmented stem may apply a bending force to the ball segment 42. Similarly, the biasing element 71, as illustrated, may be positioned between the first attachment portion 46a and the upper portion of the segmented stem 43. Accordingly, as the adjustment bolt 41 pushes the lower portion 40 of the segmented stem 43 and the second attachment portion 46b of the ball segment 42 in the +Z direction, the biasing element 71 pushes the first attachment portion 46a in the −Z direction, which may introduce a bending moment in the ball segment 42. The bending moment may increase (or decrease) a curvature of the curved portion 48, which may improve a seal of the ball segment 42 with the valve seat 44 when in the closed or seated position. Adjustment may be made throughout the life of the valve via the adjustment bolt to ensure the desired level of sealing is achieved, thereby increasing the life of the valve assembly 100.

Still referring to FIGS. 2A and 2B, various other components may be included within the valve assembly 100. For example, a thrust back 37 may circumscribe the lower portion 40 of the stem within the stem mounting bore 34. Additionally, stem packing 39 may be positioned at a plurality of locations between the segmented stem 43 and the housing 10, the bonnet 52, and/or the end cap 36. The stem packing 39 may include material that provides a seal (e.g., such as graphite) to prevent fluid leakage from the valve assembly 100. For example, stem packing 39 may be placed around the lower portion 40 of the segmented stem 43 between the thrust back 37 and the end cap 36. The stem packing 39 acts to seal the end cap 36 from a fluid in the flow duct 26. Stem packing 39 may also be positioned between the bonnet 52 and the upper portion 38 of the segmented stem 43, though other locations are contemplated and possible.

Still referring to FIGS. 2A and 2B, further included may be a live loading assembly 90 sleeved over the upper portion 38 of the segmented stem 43 within the bonnet 52. The live loading assembly 90 may provide an axial spring load to the valve assembly to maintain a desired level of stress within the stem packing 39, thereby inhibiting fluid leakage from the valve assembly 100. For example, the live loading assembly 90 may include a nut stop 92, one or more spring washers 94 (e.g., Belleville washers), and a gland 96. The gland 96 is generally a cylindrical bushing which is sized and shaped to engage the stem packing 39. The nut stop 92 (e.g., gland follower) is mounted to the segmented stem 43 (e.g., threaded onto the upper portion 38 of the segmented stem 43). Tightening of the nut stop 92 causes the gland 96 to engage and compress the stem packing 39, thereby increasing fluid-tightness. The one or more spring washers 94 (e.g., two or more, three or more, etc.) may be positioned between the gland 96 and the nut stop 92 thereby providing a spring bias between the gland 96 and the nut stop 92. The one or more spring washers 94 may circumscribe the segmented stem 43. The preloading from the spring washer 94 allows the valve assembly to absorb a change in pressure within the valve assembly 100 over time. Accordingly, the spring bias provided via the spring washers 94 may ensure and maintain compression within the stem packing 39 thereby providing improved fluid seals and providing the valve assembly 100 a longer life.

Still referring to FIGS. 2A and 2B, the valve assembly 100 may further include an adaptor 62 (such as a plurality of adapters) configured to mechanically couple the plug 11 via the upper portion 38 of the segmented stem 43 to an actuator (e.g., a rotational actuator such as a servomotor). Accordingly, the adaptor 62 may be sized and shaped to be mounted to the upper end 38a of the upper portion 38 of the segmented stem 43. For example, the adaptor 62 may include a stem receiving recess 63 sized and shaped to receive and mount to an exposed portion of the upper portion 38 of the segmented stem 43 above the bonnet 52. Rotation of the adaptor 62 via the actuator 66 may cause rotation of the upper portion 38 of the segmented stem 43, thereby opening and/or closing the valve assembly 100. In some embodiments, the adaptor 62 may be rigidly coupled to the upper portion 38 of the segmented stem 43 by the set screw 64. In embodiments, the adaptor 62 may be received by the actuator 66, which may be mounted to the bonnet mounting flange 33 of the bonnet 52 as noted hereinabove. As also noted above, the actuator 66 and/or the adaptor 62 may be interchanged with other actuators and adaptors as needed to allow for easy and quick retooling of the valve assembly 100.

In some embodiments, the adaptor 62 is made of a stainless steel. However, the adaptor 62 may be made of any suitable material, including cast iron, ductile iron, cast carbon steel, gun metal, alloy steels, and forged steels.

Referring still to FIGS. 2A and 2B, the adaptor 62 allows the valve assembly 100 to selectively open by rotating the ball segment 42 through operation of the actuator 66. When opening the valve, the actuator 66 rotates the adaptor 62, thereby rotating the upper portion 38 and the ball segment 42. The actuator 66 maintains a force to keep the valve open, and can apply a predetermined force to rotate the ball segment 42 to any position between fully opened and closed.

Further aspects of the present disclosure are provided by the subject matter of the following clauses:

What is claimed is:

1. A valve assembly, comprising: a housing comprising: a first flow opening; a second flow opening; a flow duct connecting the first flow opening to the second flow opening; and a neck defining an elongated chamber extending from the flow duct; a segmented stem comprising an upper portion and a lower portion, wherein the upper portion is positioned within the elongated chamber of the neck and the lower portion is coupled to the housing opposite the elongated chamber; a ball segment comprising a first attachment portion coupled to the upper portion of the segmented stem and a second attachment portion coupled to the lower portion of the segmented stem, and a curved portion extending between the first attachment portion and the second attachment portion; a biasing element positioned between the first attachment portion and the upper portion of the segmented stem; and an adjustment bolt coupled to the lower portion of the segmented stem, wherein the biasing element and the adjustment bolt adjusts the ball segment toward a seated position when the ball segment is rotated to a closed position.

2. The valve assembly of clause 1, further comprising a bonnet coupled to the neck, the bonnet comprising a modular multiple connector platform with a plurality of mounting openings, wherein a first set of the plurality of mounting openings are configured to interchangeably mount a first actuator to the valve assembly and a second set of the plurality of mounting openings are configured to interchangeably mount a second, different actuator to the valve assembly.

3. The valve assembly of any preceding clause, further comprising: a gland coupled to the bonnet; and a spring washer circumscribing the segmented stem and positioned within the bonnet, wherein the spring washer is compressed against the bonnet by the gland.

4. The valve assembly of any preceding clause, further comprising: a horizontal centerline passing through a center of the first flow opening and the second flow opening; and a vertical centerline passing through a center of the elongated chamber, the vertical centerline being laterally offset from the horizontal centerline.

5. The valve assembly of any preceding clause, further comprising a valve seat coupled to the housing adjacent the second flow opening, wherein the ball segment and the valve seat create a seal when the ball segment is rotated to the closed position, and the biasing element biases the ball segment toward the seated position.

6. The valve assembly of any preceding clause, further comprising an adaptor replaceably coupled to the segmented stem and shaped to be received by an actuator when mounted to the valve assembly.

7. The valve assembly of any preceding clause, wherein the biasing element is located in a recess within the first attachment portion.

8. A valve assembly, comprising: a housing comprising: a first flow opening; a second flow opening; a flow duct connecting the first flow opening to the second flow opening; and a neck defining an elongated chamber extending from the flow duct; a segmented stem comprising an upper portion and a lower portion, wherein the upper portion is positioned within the elongated chamber of the neck and the lower portion is coupled to the housing opposite the elongated chamber; a ball segment comprising a first attachment portion coupled to the upper portion of the segmented stem and a second attachment portion coupled to the lower portion of the segmented stem, and a curved portion extending between the first attachment portion and the second attachment portion; and an adaptor replaceably coupled to the upper portion of the segmented stem and configured to couple an actuator to the upper portion of the segmented stem.

9. The valve assembly of any preceding clause, further comprising: a bonnet coupled to the neck, the bonnet comprising modular multiple connector platform with a plurality of mounting openings, wherein a first set of the plurality of mounting openings are configured to interchangeably mount a first actuator to the valve assembly and a second set of the plurality of mounting openings are configured to interchangeably mount a second different actuator to the valve assembly.

10. The valve assembly of any preceding clause, further comprising: a gland coupled to the bonnet; and a spring washer circumscribing the segmented stem and positioned within the bonnet, wherein the spring washer is compressed against the bonnet by the gland.

11. The valve assembly of any preceding clause, further comprising: a horizontal centerline passing through a center of the first flow opening and the second flow opening; and a vertical centerline passing through a center of the elongated chamber, the vertical centerline being laterally offset from the horizontal centerline.

12. The valve assembly of any preceding clause, further comprising a valve seat coupled to the housing adjacent the second flow opening, wherein the ball segment and the valve seat create a seal when the ball segment is rotated to a closed position.

13. The valve assembly of any preceding clause, wherein the first set of the plurality of mounting openings have a first diameter, the second set of the plurality of mounting openings have a second diameter, where the first diameter is less than the second diameter.

14. The valve assembly of any preceding clause, further comprising a set screw coupling the adaptor to the upper portion of the segmented stem.

15. A valve assembly, comprising: a housing comprising: a first flow opening; a second flow opening; a flow duct connecting the first flow opening to the second flow opening; and a neck defining an elongated chamber extending from the flow duct; a segmented stem comprising an upper portion and a lower portion, wherein the upper portion is positioned within the elongated chamber of the neck and the lower portion is coupled to the housing opposite the elongated chamber; a ball segment comprising a first attachment portion coupled to the upper portion of the segmented stem and a second attachment portion coupled to the lower portion of the segmented stem, and a curved portion extending between the first attachment portion and the second attachment portion; a bonnet coupled to the neck, the bonnet comprising a modular multiple connector platform with a plurality of mounting openings, wherein the plurality of mounting openings include a first set and a second set; and an actuator interchangeably coupled to the modular multiple connector platform via one of the first set or the second set of the plurality of mounting openings.

16. The valve assembly of any preceding clause, further comprising: a gland coupled to the bonnet; and a spring washer circumscribing the segmented stem and positioned within the bonnet, wherein the spring washer is compressed against the bonnet by the gland.

17. The valve assembly of any preceding clause, further comprising: a horizontal centerline passing through a center of the first flow opening and the second flow opening; and a vertical centerline passing through a center of the elongated chamber, the vertical centerline being offset from the horizontal centerline.

18. The valve assembly of any preceding clause, further comprising a valve seat coupled to the housing adjacent the second flow opening, wherein the ball segment and the valve seat create a seal when the ball segment is rotated to a closed position.

19. The valve assembly of any preceding clause, further comprising an adaptor replaceably coupled to the segmented stem and shaped to be received by the actuator when mounted to the valve assembly.

20. The valve assembly of any preceding clause, wherein the first set of the plurality of mounting openings comprise a first diameter, the second set of the plurality of mounting openings have a second diameter, wherein the first diameter is less than the second diameter.

It should now be understood that embodiments of the present disclosure are directed to valve assemblies that may be modularly adaptable to various actuators to enable automated control. For example, in embodiments according to the present disclosure the valve may have an integral platform defining a plurality of mounting openings. The plurality of mounting openings may include a first plurality of mounting openings corresponding to a first actuator type, a second plurality of mounting openings corresponding to a second actuator type, etc. In some embodiments, adaptors for coupling the segmented stem of the valve to the actuator may also be included, or may be separately available. Accordingly, the valves according to the present disclosure may be easily and quickly retooled for different types of actuators as desired. In some embodiments, to provide for improved seating of the ball segment into the valve seat, one or more biasing elements may be included which bias the ball segment into contact with the valve seat to ensure a fluid-tight seal, thereby increasing reliability of the valve and valve life.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A valve assembly, comprising:
   a housing comprising:
      a first flow opening;
      a second flow opening;
      a flow duct connecting the first flow opening to the second flow opening; and
      a neck defining an elongated chamber extending from the flow duct;
   a segmented stem comprising an upper portion and a lower portion, wherein the upper portion is positioned within the elongated chamber of the neck and the lower portion is coupled to the housing opposite the elongated chamber;
   a ball segment comprising a first attachment portion coupled to the upper portion of the segmented stem and a second attachment portion coupled to the lower portion of the segmented stem, and a curved portion extending between the first attachment portion and the second attachment portion;
   an adaptor replaceably coupled to the upper portion of the segmented stem and configured to couple an actuator to the upper portion of the segmented stem; and
   a bonnet coupled to the neck, the bonnet comprising a modular multiple connector platform with a plurality of mounting openings, wherein a first set of the plurality of mounting openings are configured to interchangeably mount a first actuator to the valve assembly, a second set of the plurality of mounting openings are configured to interchangeably mount a second different actuator to the valve assembly, and a third set of the plurality of mounting openings are configured to interchangeably mount a third different actuator to the valve assembly, each of the first set of the plurality of mounting openings, the second set of the plurality of mounting openings, and the third set of the plurality of mounting openings comprise two or more openings.

2. The valve assembly of claim 1, further comprising:
a gland coupled to the bonnet; and
a spring washer circumscribing the segmented stem and positioned within the bonnet, wherein the spring washer is compressed against the bonnet by the gland.

3. The valve assembly of claim 1, further comprising:
a horizontal centerline passing through a center of the first flow opening and the second flow opening; and
a vertical centerline passing through a center of the elongated chamber, the vertical centerline being laterally offset from the horizontal centerline.

4. The valve assembly of claim 1, further comprising a valve seat coupled to the housing adjacent the second flow opening, wherein the ball segment and the valve seat create a seal when the ball segment is rotated to a closed position.

5. The valve assembly of claim 1, wherein the first set of the plurality of mounting openings have a first diameter, the second set of the plurality of mounting openings have a second diameter, where the first diameter is less than the second diameter.

6. The valve assembly of claim 1, further comprising a set screw coupling the adaptor to the upper portion of the segmented stem.

7. A valve assembly, comprising:
a housing comprising:
 a first flow opening;
 a second flow opening;
 a flow duct connecting the first flow opening to the second flow opening; and
 a neck defining an elongated chamber extending from the flow duct;
a segmented stem comprising an upper portion and a lower portion, wherein the upper portion is positioned within the elongated chamber of the neck and the lower portion is coupled to the housing opposite the elongated chamber;
a ball segment comprising a first attachment portion coupled to the upper portion of the segmented stem and a second attachment portion coupled to the lower portion of the segmented stem, and a curved portion extending between the first attachment portion and the second attachment portion;
a bonnet coupled to the neck, the bonnet comprising a modular multiple connector platform with a plurality of mounting openings, wherein a first set of the plurality of mounting openings are configured to interchangeably mount a first actuator to the valve assembly, a second set of the plurality of mounting openings are configured to interchangeably mount a second different actuator to the valve assembly, and a third set of the plurality of mounting openings are configured to interchangeably mount a third different actuator to the valve assembly, each of the first set of the plurality of mounting openings, the second set of the plurality of mounting openings, and the third set of the plurality of mounting openings comprise two or more openings; and
an actuator interchangeably coupled to the modular multiple connector platform via one of the first set or the second set of the plurality of mounting openings.

8. The valve assembly of claim 7 comprising:
a biasing element positioned between the first attachment portion and the upper portion of the segmented stem, the biasing element comprising a spring located in a recess formed through the upper portion of the segmented stem such that the spring extends along an elongated axis of the segmented stem internally from the first attachment portion through the upper portion; and
an adjustment bolt coupled to the lower portion of the segmented stem, wherein the biasing element and the adjustment bolt adjusts the ball segment toward a seated position when the ball segment is rotated to a closed position;
wherein the upper portion and the recess formed through the upper portion of the segmented stem extend into a stem opening that is recessed into the first attachment portion.

9. The valve assembly of claim 7, further comprising:
a gland coupled to the bonnet; and
a spring washer circumscribing the segmented stem and positioned within the bonnet, wherein the spring washer is compressed against the bonnet by the gland.

10. The valve assembly of claim 7, further comprising:
a horizontal centerline passing through a center of the first flow opening and the second flow opening; and
a vertical centerline passing through a center of the elongated chamber, the vertical centerline being offset from the horizontal centerline.

11. The valve assembly of claim 7, further comprising a valve seat coupled to the housing adjacent the second flow opening, wherein the ball segment and the valve seat create a seal when the ball segment is rotated to a closed position.

12. The valve assembly of claim 7, further comprising an adaptor replaceably coupled to the segmented stem and shaped to be received by the actuator when mounted to the valve assembly.

13. The valve assembly of claim 7, wherein the first set of the plurality of mounting openings comprise a first diameter, the second set of the plurality of mounting openings have a second diameter, wherein the first diameter is less than the second diameter.

* * * * *